(12) United States Patent
Maeda et al.

(10) Patent No.: US 12,505,023 B2
(45) Date of Patent: Dec. 23, 2025

(54) INFORMATION PROCESSING DEVICE, INFORMATION PROCESSING SYSTEM, COMPUTER PROGRAM PRODUCT, AND INFORMATION PROCESSING METHOD

(71) Applicant: KABUSHIKI KAISHA TOSHIBA, Tokyo (JP)

(72) Inventors: Tomonori Maeda, Kawasaki Kanagawa (JP); Fukutomo Nakanishi, Tokyo (JP); Toshiharu Ooya, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 8 days.

(21) Appl. No.: 18/589,533

(22) Filed: Feb. 28, 2024

(65) Prior Publication Data

US 2024/0427688 A1 Dec. 26, 2024

(30) Foreign Application Priority Data

Jun. 20, 2023 (JP) ................. 2023-100578

(51) Int. Cl.
*G06F 11/00* (2006.01)
*G06F 11/34* (2006.01)
(52) U.S. Cl.
CPC ................. *G06F 11/3476* (2013.01)
(58) Field of Classification Search
CPC .................................................. G06F 11/3476
USPC ........................................................ 714/1–57
See application file for complete search history.

(56) References Cited

U.S. PATENT DOCUMENTS

| | | | |
|---|---|---|---|
| 10,476,896 B2 | 11/2019 | DiValentin et al. | |
| 10,530,796 B2 | 1/2020 | Patterson et al. | |
| 11,212,306 B2 | 12/2021 | Patterson et al. | |
| 11,323,460 B2 | 5/2022 | DiValentin et al. | |
| 2004/0225381 A1* | 11/2004 | Ritz .................... | G06F 11/0793 700/87 |
| 2015/0347266 A1* | 12/2015 | Sivathanu ............. | G06F 11/348 714/45 |

(Continued)

FOREIGN PATENT DOCUMENTS

| | | |
|---|---|---|
| JP | 2019-531519 A | 10/2019 |
| JP | 6585131 B2 | 10/2019 |

(Continued)

*Primary Examiner* — Sarai E Butler
(74) *Attorney, Agent, or Firm* — Finnegan, Henderson, Farabow, Garrett & Dunner, LLP

(57) ABSTRACT

According to one embodiment, an information processing device includes a memory and one or more processors coupled to the memory. The one or more processors are configured to: acquire a violation log violating a normal list from a plurality of logs, and specify, as a head process, a process that has caused a phenomenon a history of which is described in the violation log; acquire a log sequence including a log of the head process and respective logs of processes of multiple generations successively tracing a generation source of the head process back to the past; detect, as a normal subsequence, a newest subsequence in which a predetermined first generation number of normal parent-child relations in the log sequence are consecutive based on a normal graph; and cause an analysis object storage device to store part of the log sequence at least from the violation log to the normal subsequence.

11 Claims, 16 Drawing Sheets

(56) References Cited

U.S. PATENT DOCUMENTS

| | | | |
|---|---|---|---|
| 2016/0179598 A1* | 6/2016 | Lvin | H04L 41/22 |
| | | | 714/48 |
| 2019/0171826 A1 | 6/2019 | Lee | |
| 2021/0019653 A1* | 1/2021 | Akimoto | G06F 18/2132 |
| 2021/0149374 A1* | 5/2021 | Takahashi | G05B 19/41885 |
| 2021/0203660 A1 | 7/2021 | Nagayama et al. | |
| 2022/0206886 A1* | 6/2022 | Srivastava | G06F 11/079 |
| 2022/0365841 A1* | 11/2022 | Yamaguchi | G06F 11/0793 |
| 2023/0259436 A1* | 8/2023 | Meeran | G06F 11/3006 |
| | | | 714/37 |
| 2023/0297460 A1* | 9/2023 | Tonari | G06F 11/0793 |
| | | | 714/48 |

FOREIGN PATENT DOCUMENTS

| | | |
|---|---|---|
| JP | 6599946 B2 | 10/2019 |
| WO | WO 2019/225710 A1 | 11/2019 |

* cited by examiner

FIG.2

| OUTLINE | FILE CREATION |
|---|---|
| PROCESS ID | 000002 |
| PARENT PROCESS NAME | XXX.exe |
| PARENT PROCESS ID | 000001 |
| FILE NAME | abc |
| FILE PATH | C:\Users\someone\Documents\abc |

FIG.3

| OUTLINE | FILE CREATION |
|---|---|
| PROCESS ID | 000006 |
| PARENT PROCESS NAME | ZZZ.exe |
| PARENT PROCESS ID | 000007 |
| FILE NAME | xyz |
| FILE PATH | C:\Users\someone\Documents\xyz |

FIG.4

| | | | |
|---|---|---|---|
| 111 | OUTLINE | CHILD PROCESS GENERATION | 112 |
| 111 | PARENT PROCESS NAME | XXX.exe | 112 |
| 111 | PARENT PROCESS ID | 000001 | 112 |
| 111 | CHILD PROCESS NAME | YYY.exe | 112 |
| 111 | CHILD PROCESS ID | 000004 | 112 |

FIG.5

| | | | |
|---|---|---|---|
| 111 | OUTLINE | CHILD PROCESS GENERATION | 112 |
| 111 | PARENT PROCESS NAME | WWW.exe | 112 |
| 111 | PARENT PROCESS ID | 000005 | 112 |
| 111 | CHILD PROCESS NAME | ZZZ.exe | 112 |
| 111 | CHILD PROCESS ID | 000006 | 112 |

FIG.6

NORMAL LIST rule_1 : OUTLINE IS "FILE CREATION", AND "FILE NAME" BEGINS WITH "ab".

rule_2 : WHEN OUTLINE IS "CHILD PROCESS GENERATION" AND "CHILD PROCESS NAME" IS "YYY.exe", "PARENT PROCESS NAME" IS NOT "XXX.exe".

| NORMAL GRAPH | |
|---|---|
| RULE NAME | rule_1 |
| PARENT RULE NAME | rule_5<br>rule_8<br>rule_12 |

⋮

| | |
|---|---|
| RULE NAME | rule_5 |
| PARENT RULE NAME | rule_9<br>rule_11<br>rule_12 |

⋮

| | |
|---|---|
| RULE NAME | rule_8 |
| PARENT RULE NAME | rule_8<br>rule_13<br>rule_18 |

⋮

| | |
|---|---|
| RULE NAME | rule_12 |
| PARENT RULE NAME | rule_1<br>rule_15<br>rule_18 |

⋮

| | |
|---|---|
| RULE NAME | rule_18 |
| PARENT RULE NAME | rule_3<br>rule_4<br>rule_17 |

INFORMATION PROCESSING DEVICE, INFORMATION PROCESSING SYSTEM, COMPUTER PROGRAM PRODUCT, AND INFORMATION PROCESSING METHOD

CROSS-REFERENCE TO RELATED APPLICATIONS

This application is based upon and claims the benefit of priority from Japanese Patent Application No. 2023-100578, filed on Jun. 20, 2023; the entire contents of which are incorporated herein by reference.

FIELD

Embodiments described herein relate generally to an information processing device, an information processing system, a computer program product, and an information processing method.

BACKGROUND

There is known a management system called Security Information and Event Management (SIEM). The SIEM collects logs from all devices in a network, and monitors the logs of all the devices by one server. The SIEM can monitor the logs of all the devices in the network by one log server, and thus detection of an attack, forensic, and the like can be easily performed.

However, in a case in which such a management system is applied to a large-scale network, the number of logs collected by the server becomes enormous. Thus, in view of a capacity for storing logs and an analysis amount for analyzing logs, it is very difficult for the management system to store all of the logs in the server and analyze all of the logs.

Due to this, in a case in which a large number of logs are generated, the management system selects and reduces logs to be collected, or limits the number of logs to be collected by using a normal list. In a case of limiting logs to be collected by using the normal list, the management system stores only logs that are not present in the normal list. However, it is difficult to know a process of generating a log that is not present in the normal list. Thus, even in a case of storing a log that is not present in the normal list, the management system is difficult to determine whether the stored log is a log generated by an attack or a normal log.

As a technique of solving such a problem, for example, there is known a technique of generating a graphical model including one or more nodes and edges representing a time-series feature of the log, and specifying an abnormal event. In this technique, only logs having a high risk can be extracted based on a relation between a plurality of logs. However, in this technique, logs before and after all of a large number of logs need to be temporarily stored, and a graphical model needs to be generated. Thus, in this technique, a capacity of a storage device for temporarily storing the logs is increased, and an arithmetic amount for generating the graphical model becomes enormous.

There is also known a technique of analyzing abnormality of communication and a cause of the abnormality of communication based on a graph feature amount of a communication pattern. Also in this technique, only logs having a high risk can be extracted based on a relation among a plurality of logs. However, in this technique, logs before and after all of a large number of logs need to be temporarily stored, and a graph feature amount needs to be calculated. Thus, also in this technique, the capacity of the storage device for temporarily storing the logs is increased, and the arithmetic amount for calculating the graph feature amount further becomes enormous.

There is also known a technique of checking whether each log is normal by tracing back a parent process of a corresponding log and checking whether to reach a log that is defined to be normal. Also in this technique, only logs having a high risk can be extracted based on a relation among a plurality of logs. However, in this technique, a malicious computer program that performs an attack with interposing a normal process therebetween may be recognized as a normal computer program. For example, in a case in which malware is downloaded in an operating system such as Windows (registered trademark), and then the malware is executed by explorer.exe, a parent process for generating the malware is explorer.exe. In such a case, in this technique, the executed malware may be recognized as a normal process when explorer.exe is defined as a normal computer program.

BRIEF DESCRIPTION OF THE DRAWINGS

FIG. 2 is a diagram illustrating a first example of a log;

FIG. 3 is a diagram illustrating a second example of a log;

FIG. 4 is a diagram illustrating a third example of a log;

FIG. 5 is a diagram illustrating a fourth example of a log;

FIG. 6 is a diagram illustrating an example of a normal list;

FIG. 7 is a diagram illustrating an example of a normal graph;

DETAILED DESCRIPTION

In general, according to one embodiment, an information processing device, which is configured to cause an analysis object storage device to store some of a plurality of logs each describing a history of a phenomenon occurred in a target device, includes a memory and one or more processors coupled to the memory. The one or more processors are configured to: acquire, from among the plurality of logs, a violation log violating a normal list in which a condition for a normal log is described, and specify, as a head process, a process that has caused the phenomenon the history of which is described in the violation log; acquire a log sequence including a log of the head process and respective logs of processes of multiple generations successively tracing a generation source of the head process back to the past; detect, assuming that a process a history of which is described in an optional log is a child process and a process as a generation source of the child process is a parent process, based on a normal graph describing a condition for a normal parent-child relation between a log describing the history of the child process and a log describing a history of the parent process, a newest subsequence in which a predetermined first generation number of normal parent-child relations in the log sequence are consecutive as a normal subsequence; and cause the analysis object storage device to store part of the log sequence at least from the violation log to the normal subsequence.

Exemplary embodiments of an information processing device will be explained below in detail with reference to the accompanying drawings. The present invention is not limited to the following embodiments.

First Embodiment

Figure 1:
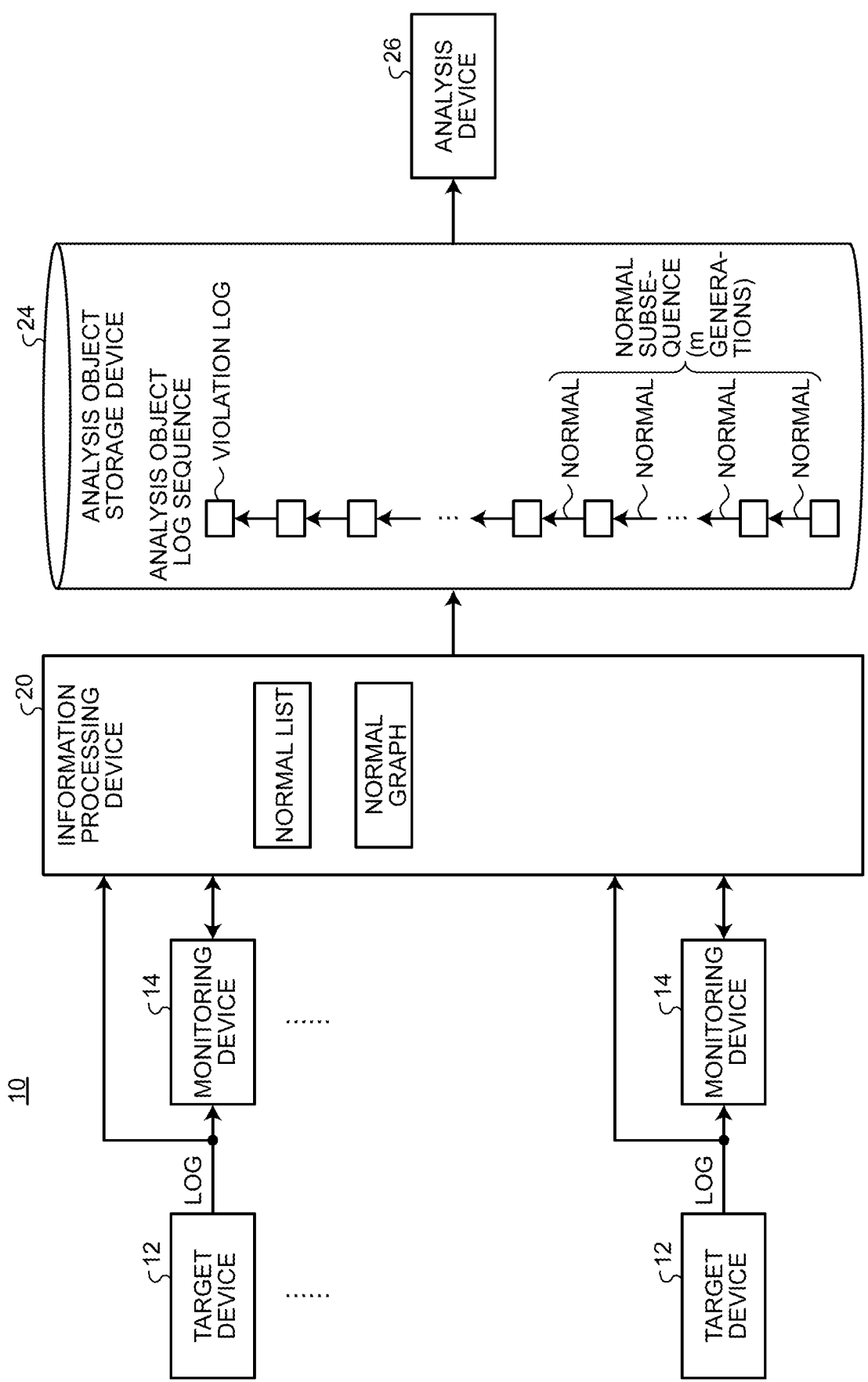
FIG. 1 is a diagram illustrating an information processing system.

FIG. 1 is a diagram illustrating an information processing system 10.

The information processing system 10 includes one or a plurality of target devices 12, one or a plurality of monitoring devices 14, an information processing device 20, an analysis object storage device 24, and an analysis device 26.

Each of one or a plurality of the target devices 12 is a device including a processor and a memory, and configured to perform information processing when the processor and the memory execute a computer program. Each of one or a plurality of the target devices 12 may be a computer, a robot, or a device having an information processing function installed in a facility of an infrastructure such as a factory or a plant.

Each of one or a plurality of the target devices 12 generates, every time a phenomenon occurs, a log describing a history of the occurred phenomenon. Each of one or a plurality of the target devices 12 is associated with any one of one or a plurality of the monitoring devices 14. Each of one or a plurality of the target devices 12 then outputs the generated log to the associated monitoring device 14. Each of one or a plurality of the target devices 12 also outputs the generated log to the information processing device 20. Details about the log will be described later with reference to FIG. 2, FIG. 3, FIG. 4, and FIG. 5.

The phenomenon that occurs in each of one or a plurality of the target devices 12 is, for example, an event that occurs in the target device 12 or a process performed by the target device 12. By way of example, the event is an action detected by the target device 12, an input operation on the target device 12, a notification from an external device, and the like. The process is processing of the computer program executed by the target device 12.

Each of one or a plurality of the monitoring devices 14 is a device including a processor and a memory, and configured to perform information processing when the processor executes a computer program on the memory. One or a plurality of the monitoring devices 14 may correspond to one or a plurality of the target devices 12 on a one-to-one basis. If each of one or a plurality of the target devices 12 corresponds to any one of the monitoring devices 14, any one of one or a plurality of the monitoring devices 14 may correspond to two or more of the target devices 12. Any one of one or a plurality of the monitoring devices 14 may be integrated with a corresponding one of the target devices 12. Any one of one or a plurality of the monitoring devices 14 may be integrated with the information processing device 20.

Each of one or a plurality of the monitoring devices 14 receives a log from an associated one of one or a plurality of the target devices 12. Each of one or a plurality of the monitoring devices 14 stores the received log.

Each of one or a plurality of the monitoring devices 14 receives an acquisition request including information for specifying a head process from the information processing device 20. Each of one or a plurality of the monitoring devices 14 selects, from a large number of stored logs, a log sequence including a log describing a history of the head process indicated by the acquisition request, and respective logs of processes of multiple generations tracing a generation source of the head process back to the past. Each of one or a plurality of the monitoring devices 14 outputs the selected log sequence to the information processing device 20.

The information processing device 20 is a device including a processor and a memory, and configured to perform information processing when the processor executes a computer program on the memory. The information processing device 20 may be a server device, or may be a cloud and the like in which one or a plurality of server devices operate in cooperation with each other. The information processing device 20 causes the analysis object storage device 24 to store some of a plurality of logs to be analysis objects, the logs describing a history of a phenomenon that occurs in one or a plurality of the target devices 12.

The information processing device 20 stores a normal list determined in advance, and a normal graph determined in advance.

The normal list is information in which conditions for a normal log are described. For example, the normal list includes one or a plurality of rules describing conditions for a normal log. Details about the normal list will be described later with reference to FIG. 6.

The normal graph is information in which conditions for a normal parent-child relation are described. The parent-child relation is, assuming that a process the history of which is described in an optional log is a child process and a process that is a generation source of the child process is a parent process, a relation between the log describing the history of the child process and a log describing a history of the parent process. For example, the normal graph includes a rule that should be satisfied by the log describing the history of the parent process in a case in which the log describing the history of the child process satisfies a target rule, regarding each of one or a plurality of the rules. Details about the normal graph will be described later with reference to FIG. 7, FIG. 8, and FIG. 9.

The information processing device 20 acquires a log from each of one or a plurality of the target devices 12. Every time of acquiring the log, the information processing device 20 determines whether the acquired log is a violation log, which is a log that violates the normal list. In a case in which the acquired log is the violation log, the information processing device 20 specifies, as the head process, a process that has caused a phenomenon the history of which is described in the violation log.

Subsequently, the information processing device 20 gives the acquisition request including the information for specifying the head process to the monitoring device 14 storing the acquired log. The information processing device 20 then acquires, from the corresponding monitoring devices 14, a log sequence including a log of the head process and respective logs of processes of multiple generations successively tracing a generation source of the head process back to the past.

Subsequently, the information processing device 20 detects, as a normal subsequence, the newest subsequence in which a predetermined first generation number of normal parent-child relations in the log sequence are consecutive. Specifically, the information processing device 20 successively traces the acquired log sequence back to the past from the log of the head process, and detects the normal subsequence based on the normal graph. The first generation number is represented as m, which is an integer number equal to or larger than 2 determined in advance.

The information processing device 20 then causes the analysis object storage device 24 to store part of the acquired log sequence at least from the violation log to the normal subsequence as an analysis object log sequence to be an analysis object. The analysis object log sequence may include a past log older than the normal subsequence so long as the analysis object log sequence includes at least the violation log to the normal subsequence.

The analysis object storage device 24 stores the analysis object log sequence generated by the information processing device 20. The analysis object storage device 24 may be a device that is disposed integrally with the information processing device 20. The analysis object storage device 24 may also be a storage device that is disposed on a network and accessed by a terminal device and the like via the network.

The analysis device 26 acquires the analysis object log sequence stored in the analysis object storage device 24. The analysis device 26 analyzes a plurality of logs included in the acquired analysis object log sequence to analyze presence/absence and types of attacks on one or a plurality of the target devices 12, possibility of an attack, and the like. The analysis device 26 then displays, for example, an analysis result on a display device and the like to be output to a user.

FIG. 2 is a diagram illustrating a first example of the log.
FIG. 3 is a diagram illustrating a second example of the log.
FIG. 4 is a diagram illustrating a third example of the log.
FIG. 5 is a diagram illustrating a fourth example of the log.

The log is information in which a history of a phenomenon such as an event that occurs in the target device 12 and a process performed by the target device 12 is described in a format determined in advance that can be interpreted by the processor. The log may be described in any format so long as it is described in a format determined in advance.

By way of example, the log includes a plurality of items 111 and a plurality of entries 112. The items 111 and the entries 112 correspond to each other on a one-to-one basis. Each of the items 111 represents a caption of information described in corresponding one of the entries 112. In each of the entries 112, described is a history of corresponding one of the items 111 in a phenomenon such as an event or a process.

The log includes, as the items, "outline", "process ID", "parent process name", "parent process ID", "file name", "file path", "child process name", "child process ID", and the like.

As "outline", information representing content of a target phenomenon such as an event or a process is described in corresponding one of the entries 112. As "process ID", identification information for identifying a target process is described in corresponding one of the entries 112. As "parent process name", a name of a parent process as a generation source of the target process is described in corresponding one of the entries 112. As "parent process ID", identification information for identifying the parent process as the generation source of the target process is described in corresponding one of the entries 112. As "file name", a name of a file generated by the target process is described in corresponding one of the entries 112. As "file path", a path indicating a storage position of the file generated by the target process is described in corresponding one of the entries 112. As "child process name", a name of a child process generated by the target process as the parent process is described in corresponding one of the entries 112. As "child process ID", identification information for identifying the child process generated by the target process as the parent process is described in corresponding one of the entries 112.

The information described in the log is not limited to the information illustrated in FIG. 3 to FIG. 5. The items described in the log may include only some of the items determined by the format, some of the items required for describing a history of the target phenomenon such as an event or a process.

The information processing system 10 according to the present embodiment uses a log in a format that can include information for specifying the parent process. For example, a log of Sysmon of Windows (registered trademark) and the like can include information for specifying the parent process.

FIG. 6 is a diagram illustrating an example of the normal list. The normal list is information in which conditions for a normal log is described in a format determined in advance that can be interpreted by the processor.

In the present embodiment, the normal list includes one or a plurality of rules describing conditions for a normal log.

For example, the normal list illustrated in FIG. 6 includes a first rule (rule_1) indicating that "file name" begins with "ab" in a case in which "outline" is "file creation". Thus, in a case in which "file creation" is written in "outline" of the acquired log, if characters beginning with "ab" are written in "file name", the information processing device 20 determines that the acquired log is normal. In a case in which "file creation" is written in "outline" of the acquired log, if characters beginning with "ab" are not written in "file name", the information processing device 20 determines that the acquired log violates the normal list.

For example, the normal list illustrated in FIG. 6 includes a second rule (rule_2) indicating that "parent process name" is not "XXX.exe" in a case in which "outline" is "child process generation" and "child process name" is "YYY.exe". Thus, in a case in which "file creation" is written in "outline" and "YYY.exe" is written in "child process name" in the acquired log, if characters other than "XXX.exe" are written in "parent process name", the information processing device 20 determines that the acquired log is normal. In a case in which "file creation" is written in "outline" and "YYY.exe" is written in "child process name" in the acquired log, if "XXX.exe" is written in "parent process name", the information processing device 20 determines that the acquired log is a violation log.

For example, the log illustrated in FIG. 2 satisfies the first rule (rule_1) in the normal list illustrated in FIG. 6. Thus, in this case, the information processing device 20 determines that the log illustrated in FIG. 2 is normal. For example, the log illustrated in FIG. 3 does not satisfy the first rule (rule_1) in the normal list illustrated in FIG. 6. Thus, in this case, the information processing device 20 determines that the log illustrated in FIG. 3 is a violation log.

For example, the log illustrated in FIG. 4 does not satisfy the second rule (rule_2) in the normal list illustrated in FIG. 6. Thus, in this case, the information processing device 20 determines that the log illustrated in FIG. 4 is a violation log. For example, the log illustrated in FIG. 5 satisfies the second rule (rule_2) in the normal list illustrated in FIG. 6. Thus, in this case, the information processing device 20 determines that the log illustrated in FIG. 5 is normal.

In the example of FIG. 6, each of the rules in the normal list is written as a sentence. However, a method for writing the normal list is not limited to using a sentence, but any method or description language may be used so long as it can be interpreted by the processor.

FIG. 7 is a diagram illustrating an example of the normal graph. The normal graph is information in which conditions for a normal parent-child relation is described in a format determined in advance that can be interpreted by the processor.

In the present embodiment, the normal graph includes a rule that should be satisfied by the log describing the history of the parent process in a case in which the log describing the history of the child process satisfies a target rule, regarding each of one or a plurality of the rules. For example, the normal graph illustrated in FIG. 7 includes a rule that should be satisfied by the log describing the history of the parent process in a case in which the log describing the history of the child process satisfies the target rule, regarding each of the first rule (rule_1) to eighteenth rule (rule_18).

For example, the normal graph illustrated in FIG. 7 describes that, in a case in which the log of the child process satisfies the first rule (rule_1), the rule that should be satisfied by the log of the parent process is the fifth rule (rule_5), the eighth rule (rule_8), or the twelfth rule (rule_12).

The normal graph illustrated in FIG. 7 describes that, in a case in which the log of the child process satisfies the fifth rule (rule_5), the rule that should be satisfied by the log of the parent process is the ninth rule (rule_9), the eleventh rule (rule_11), or the twelfth rule (rule_12).

The normal graph illustrated in FIG. 7 describes that, in a case in which the log of the child process satisfies the eighth rule (rule_8), the rule that should be satisfied by the log of the parent process is the eighth rule (rule_8), the thirteenth rule (rule_13), or the eighteenth rule (rule_18).

The normal graph illustrated in FIG. 7 describes that, in a case in which the log of the child process satisfies the twelfth rule (rule_12), the rule that should be satisfied by the log of the parent process is the first rule (rule_1), the fifteenth rule (rule_15), or the eighteenth rule (rule_18).

The normal graph illustrated in FIG. 7 describes that, in a case in which the log of the child process satisfies the eighteenth rule (rule_18), the rule that should be satisfied by the log of the parent process is the third rule (rule_3), the fourth rule (rule_4), or the seventeenth rule (rule_17).

Figure 8:
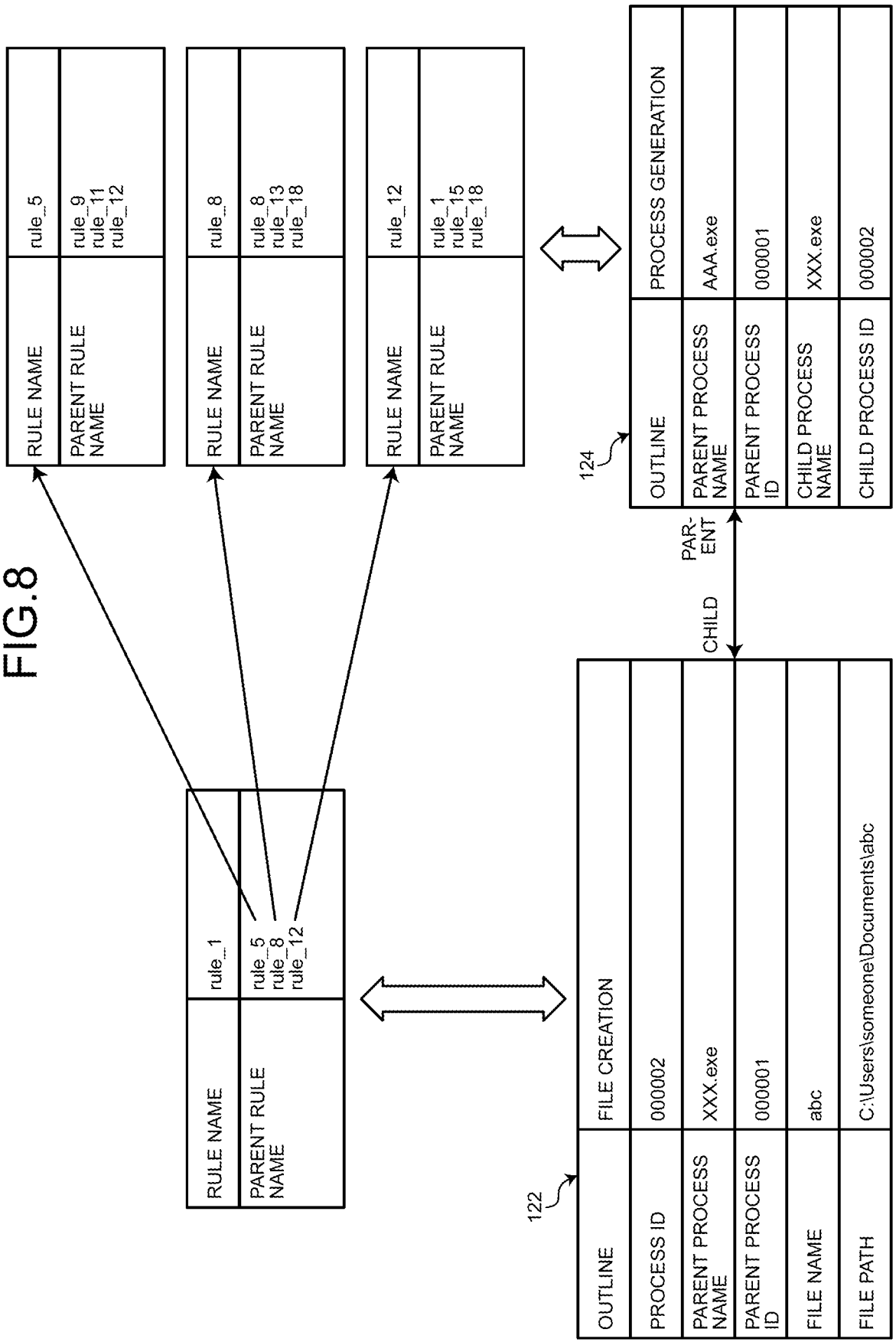
FIG. 8 is a diagram illustrating a first example in a case of comparing parent-child relations using the normal graph.

FIG. 8 is a diagram illustrating a first example in a case of comparing the parent-child relations using the normal graph.

For example, a first log 122 illustrated in FIG. 8 as an example of the log describes a history of the child process. In the first log 122, "outline" is "file creation", "process ID" is "000002", "parent process name" is "XXX.exe", "parent process ID" is "000001", "file name" is "abc", and "file path" is "C:\Users\someone\Documents\abc".

A second log 124 illustrated in FIG. 8 as an example of the log describes a history of the parent process as a generation source of the child process the history of which is described in the first log 122. In the second log 124, "outline" is "process generation", "parent process name" is "AAA.exe", "parent process ID" is "000001", "child process name" is "XXX.exe", and "child process ID" is "000002".

The first log 122 satisfies the first rule (rule_1). The normal graph describes that, regarding the first rule (rule_1), the parent process should satisfy the fifth rule (rule_5), the eighth rule (rule_8), or the twelfth rule (rule_12). Thus, in this case, if the second log 124 satisfies any one of the fifth rule (rule_5), the eighth rule (rule_8), and the twelfth rule (rule_12), the information processing device 20 can determine that the parent-child relation between the first log 122 and the second log 124 is normal. In the example of FIG. 8, the second log 124 satisfies the twelfth rule (rule_12). Thus, in this case, the information processing device 20 determines that the first log 122 and the second log 124 have a normal parent-child relation satisfying the normal graph.

Figure 9:
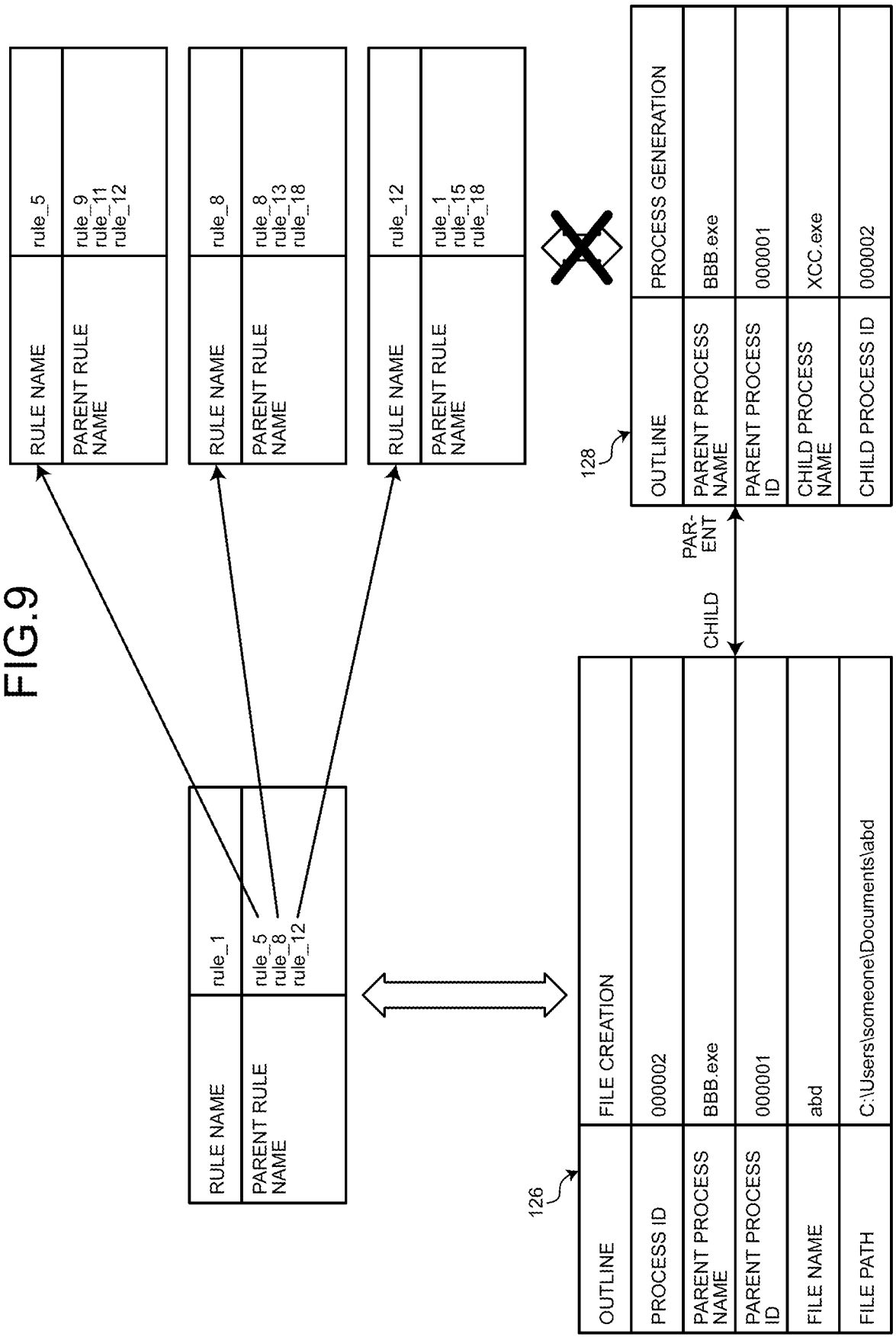
FIG. 9 is a diagram illustrating a second example in a case of comparing parent-child relations using the normal graph.

FIG. 9 is a diagram illustrating a second example in a case of comparing the parent-child relations using the normal graph.

For example, a third log 126 illustrated in FIG. 9 as an example of the log describes the history of the child process. In the third log 126, "outline" is "file creation", "process ID" is "000002", "parent process name" is "XXX.exe", "parent process ID" is "000001", "file name" is "abd", and "file path" is "C:\Users\someone\Documents\abd".

For example, a fourth log 128 illustrated in FIG. 9 as an example of the log describes the history of the parent process as a generation source of the child process the history of which is represented by the third log 126. In the fourth log 128, "outline" is "process generation", "parent process name" is "BBB.exe", "parent process ID" is "000001", "child process name" is "XCC.exe", and "child process ID" is "000002".

The third log 126 satisfies the first rule (rule_1). The normal graph describes that, regarding the first rule (rule_1), the parent process should satisfy the fifth rule (rule_5), the eighth rule (rule_8), or the twelfth rule (rule_12). Thus, if the fourth log 128 satisfies any one of the fifth rule (rule_5), the eighth rule (rule_8), and the twelfth rule (rule_12), the information processing device 20 can determine that the parent-child relation between the third log 126 and the fourth log 128 is normal. In the example of FIG. 9, the fourth log 128 does not satisfy any of the fifth rule (rule_5), the eighth rule (rule_8), and the twelfth rule (rule_12). Thus, in this case, the information processing device 20 determines that the third log 126 and the fourth log 128 do not have a normal parent-child relation satisfying the normal graph.

Figure 10:
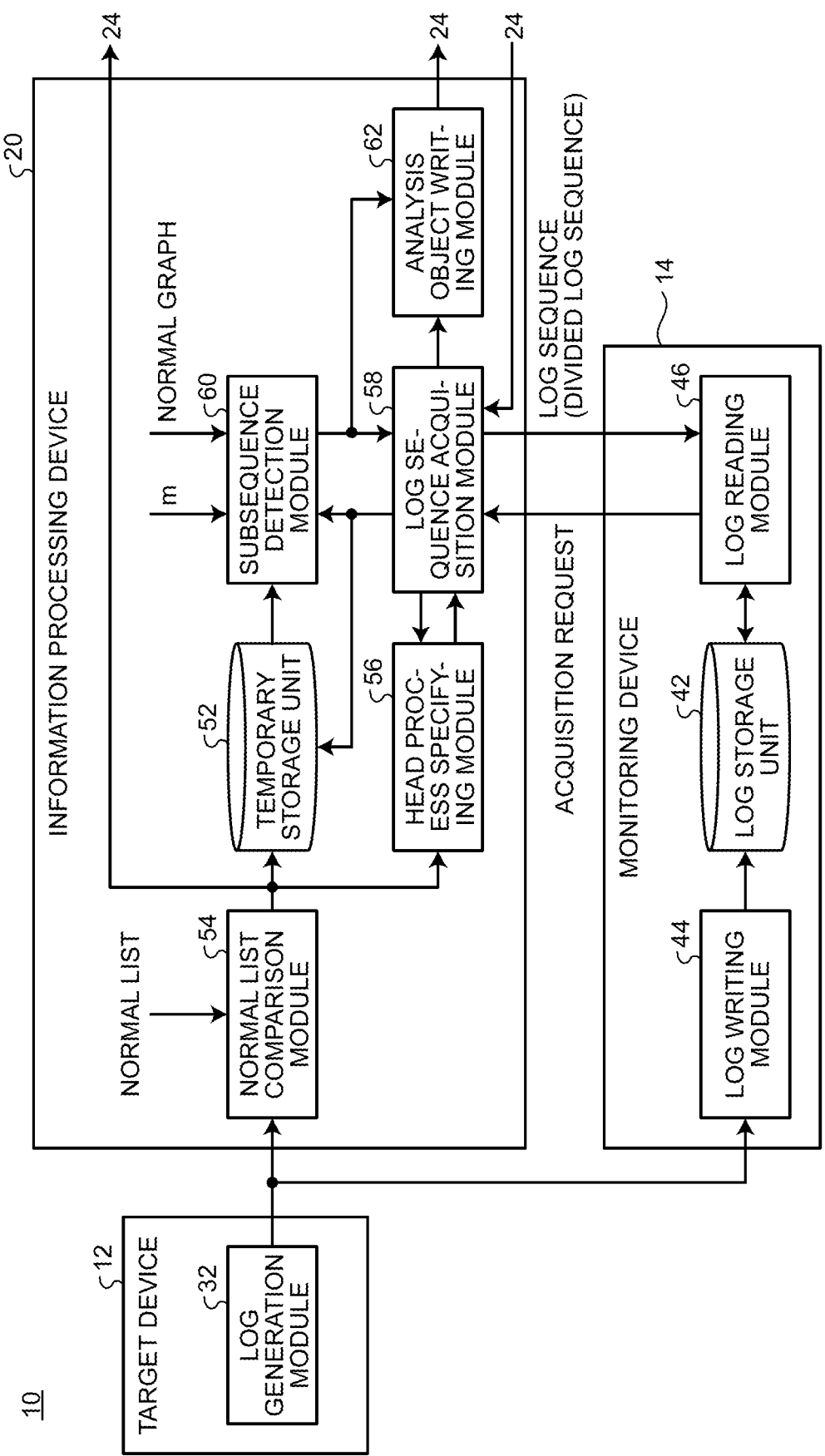
FIG. 10 is a functional configuration diagram of an information processing system according to a first embodiment.

FIG. 10 is a diagram illustrating functional configurations of the target device 12, the monitoring device 14, and the information processing device 20 in the information processing system 10 according to the first embodiment.

The target device 12 includes a log generation module 32. Every time a phenomenon occurs in the target device 12, the log generation module 32 generates a log describing a history of the occurred phenomenon. The log generation module 32 generates a log in a case in which an event occurs or a process is performed in the target device 12, for example. The log generation module 32 transmits the generated log to the information processing device 20, and the monitoring device 14 associated with the target device 12.

The monitoring device 14 includes a log storage unit 42, a log writing module 44, and a log reading module 46. The log storage unit 42 stores a plurality of logs generated by corresponding one of the target devices 12. The log writing module 44 receives the log transmitted from the corresponding target device 12, and writes the received log into the log storage unit 42.

The log reading module 46 receives an acquisition request including information for identifying the head process from the information processing device 20. In a case of receiving the acquisition request, the log reading module 46 reads out, from the log storage unit 42, a log sequence including a log of the head process and respective logs of processes of multiple generations tracing the generation source of the head process back to the past. The log reading module 46 then outputs the read-out log sequence to the information processing device 20.

In the present embodiment, every time of receiving the acquisition request, the log reading module 46 reads out a divided log sequence including logs of n generations from the log storage unit 42. n is an integer number larger than the first generation number (m) determined in advance. That is, in the present embodiment, every time of receiving the acquisition request, the log reading module 46 reads out, from the log storage unit 42, the divided log sequence including the log of the head process and respective logs of processes of (n–1) generations tracing the generation source of the head process back to the past by (n–1) generations. In the present embodiment, every time of receiving the acquisition request, the log reading module 46 outputs the read-out divided log sequence to the information processing device 20.

The information processing device 20 includes a temporary storage unit 52, a normal list comparison module 54, a head process specifying module 56, a log sequence acquisition module 58, a subsequence detection module 60, and an analysis object writing module 62.

The temporary storage unit 52 temporarily stores a plurality of logs.

In the normal list comparison module 54, the normal list is set in advance. The normal list comparison module 54 receives the log transmitted from the target device 12. Every time of receiving the log, the normal list comparison module 54 compares the received log with the normal list to determine whether the received log is a violation log violating the normal list. In a case in which the received log is the violation log, the normal list comparison module 54 writes the violation log into the analysis object storage device 24. Additionally, in a case in which the received log is the violation log, the normal list comparison module 54 writes the violation log into the temporary storage unit 52. Furthermore, in a case in which the received log is the violation log, the normal list comparison module 54 gives the violation log to the head process specifying module 56.

The head process specifying module 56 acquires the violation log. In a case of acquiring the violation log, the head process specifying module 56 specifies, as the head process, a process that has caused the phenomenon the history of which is described in the violation log. That is, the head process specifying module 56 specifies, as the head process, a parent process of the phenomenon the history of which is described in the violation log. The head process specifying module 56 gives information for identifying the specified head process to the log sequence acquisition module 58.

In a case of acquiring the information for identifying the head process from the head process specifying module 56, the log sequence acquisition module 58 gives the acquisition request including the information for identifying the head process to the monitoring device 14 corresponding to the target device 12 that has performed the head process. The log sequence acquisition module 58 then acquires, from the monitoring device 14 to which the acquisition request is given, a log sequence including the log of the head process and respective logs of processes of multiple generations successively tracing the generation source of the head process back to the past. The log sequence acquisition module 58 writes the acquired log sequence into the temporary storage unit 52. The log sequence acquisition module 58 also gives the acquired log sequence to the analysis object writing module 62.

In the subsequence detection module 60, the normal graph is set in advance. The subsequence detection module 60 detects, as a normal subsequence, the newest subsequence in which the predetermined first generation number (m generation number) of normal parent-child relations in the log sequence stored in the temporary storage unit 52 are consecutive based on the normal graph. In determining whether the parent-child relation is normal, the subsequence detection module 60 determines that the parent-child relation is normal in a case in which a rule satisfied by the log describing the history of the child process and a rule satisfied by the log describing the history of the parent process agree with the normal graph.

The analysis object writing module 62 causes the analysis object storage device 24 to store, as the analysis object log sequence to be an analysis object, part of the log sequence at least from the violation log to the normal subsequence detected by the subsequence detection module 60.

In the present embodiment, the log sequence acquisition module 58 repeatedly acquires, from the monitoring device 14, the divided log sequence obtained by dividing the log sequence for every n generations until the subsequence detection module 60 detects a normal subsequence. In this case, every time the log sequence acquisition module 58 acquires the divided log sequence, the subsequence detection module 60 detects whether a normal subsequence is included in logs from the violation log to the divided log sequence that is lastly acquired.

In the present embodiment, every time the log sequence acquisition module 58 acquires the divided log sequence, in a case in which the normal subsequence is not included in logs from the violation log to the divided log sequence that is lastly acquired, the head process specifying module 56 specifies, as the head process, a process as a generation source of the oldest log in the divided log sequence that is lastly acquired, that is, a parent process of a process of generating the oldest log of the divided log sequence that is lastly acquired. In a case of acquiring the divided log sequence at the second or later time, the subsequence detection module 60 gives, to the monitoring device 14, the acquisition request including the information for identifying the head process that is specified based on the oldest log of the divided log sequence that is lastly acquired.

In the present embodiment, every time the log sequence acquisition module 58 acquires the divided log sequence, the analysis object writing module 62 causes the analysis object storage device 24 to store the acquired divided log sequence. In the present embodiment, in a case in which a normal subsequence is included in the logs from the violation log to the divided log sequence that is lastly acquired, the subsequence detection module 60 ends the processing without acquiring the next divided log sequence. In the present embodiment, in a case in which the analysis object storage device 24 stores the log of the head process or a process as a generation source of the oldest log of the divided log sequence, the log sequence acquisition module 58 ends the processing without acquiring the next divided log sequence.

Figure 11:
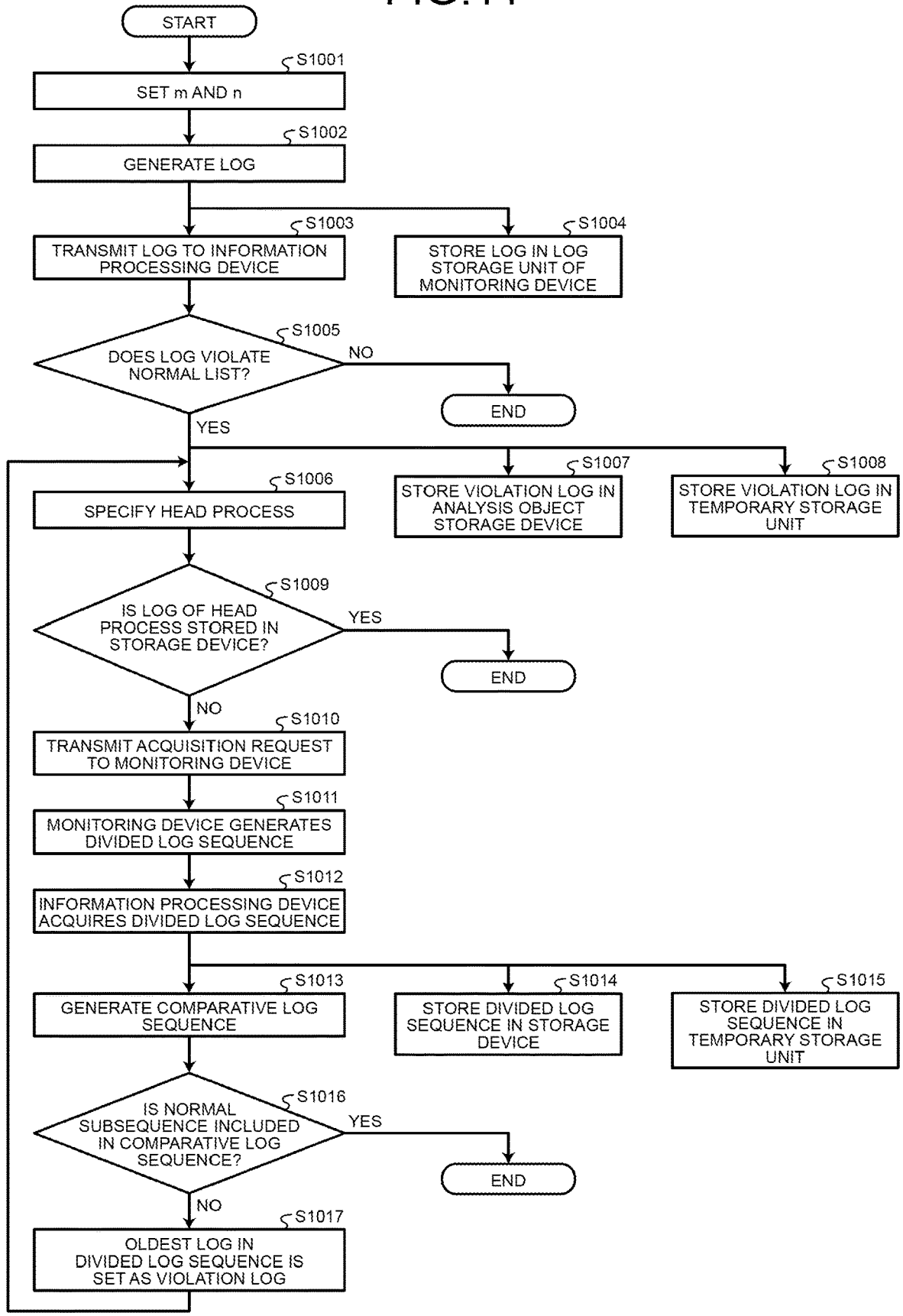
FIG. 11 is a flowchart illustrating a processing procedure of the information processing system according to the first embodiment.

FIG. 11 is a flowchart illustrating a processing procedure of the information processing system 10 according to the first embodiment. The information processing system 10 according to the first embodiment performs the processing through the procedure in FIG. 11.

First, at S1001, the information processing system 10 sets m as the first generation number and n as the number of logs to be included in the divided log sequence. For example, the information processing system 10 may set m and n input by the user. Herein, n is larger than m.

Subsequently, at S1002, the target device 12 generates a log. The information processing system 10 performs pieces of processing at S1002 and subsequent steps every time the log is generated by the target device 12.

Subsequently, at S1003, the target device 12 transmits the generated log to the information processing device 20.

Subsequently, at S1004, the target device 12 transmits the generated log to corresponding one of the monitoring devices 14, and causes the log storage unit 42 of the corresponding monitoring device 14 to store the generated log. The information processing system 10 may perform the processing at S1004 at any time after S1003.

Following S1003, at S1005, the information processing device 20 determines whether the received log violates the normal list set in advance. If the received log does not violate the normal list (No at S1005), the information processing device 20 ends the processing in this procedure about the log generated at S1002. If the received log violates the normal list (Yes at S1005), the information processing device 20 performs pieces of the processing at S1006, S1007, and S1008 assuming that the received log is the violation log.

At S1006, the information processing device 20 specifies, as the head process, the parent process that has caused an event or a process the history of which is described in the violation log. At S1007, the information processing device 20 causes the analysis object storage device 24 to store the violation log. At S1008, the information processing device 20 causes the temporary storage unit 52 to store the violation log. The information processing device 20 may perform pieces of the processing at S1006, S1007, and S1008 in any order. However, the information processing device 20 should perform the processing at S1008 before S1013.

Following S1006, at S1009, the information processing device 20 determines whether the log of the head process has been already stored in the analysis object storage device 24. If the log of the head process has been already stored in the analysis object storage device 24 (Yes at S1009), the information processing device 20 ends the processing in this procedure about the log generated at S1002. In a case in which the log of the head process has been already stored in the analysis object storage device 24, the log sequence including respective logs of processes of multiple generations successively tracing the generation source of the head process back to the past has also been already stored in the analysis object storage device 24. Thus, by ending the processing in this procedure in a case in which the log of the head process has been already stored in the analysis object storage device 24, the information processing device 20 can prevent a duplicate log from being stored in the analysis object storage device 24. If the log of the head process is not stored in the analysis object storage device 24 (No at S1009), the information processing device 20 advances the process to S1010.

At S1010, the information processing device 20 transmits the acquisition request including the information for specifying the head process to the monitoring device 14 corresponding to the target device 12 that has generated the log at S1002. The monitoring device 14 then receives the acquisition request from the information processing device 20.

Subsequently, at S1011, the monitoring device 14 that has received the acquisition request from the information processing device 20 reads out, from the log storage unit 42, the log of the head process specified by the information included in the acquisition request and respective logs of processes of n generations successively tracing the generation source of the head process back to the past. The monitoring device 14 then generates a divided log sequence including the respective logs of the processes of n generations tracing back the processes of n generations from the head process. The generation processing for the divided log sequence by the monitoring device 14 will be described later in more detail with reference to FIG. 13.

Subsequently, at S1012, the monitoring device 14 transmits the generated divided log sequence to the information processing device 20. The information processing device 20 then acquires the divided log sequence from the monitoring device 14. Following S1012, the information processing device 20 performs pieces of processing at S1013, S1014, and S1015 for the acquired divided log sequence.

At S1013, the information processing device 20 reads out a log newer than the acquired divided log sequence from the temporary storage unit 52, and generates a comparative log sequence obtained by combining the log read out from the temporary storage unit 52 with the acquired divided log sequence. In a case in which logs of generations the number of which is larger than (m+1) generations are stored in the temporary storage unit 52, the information processing device 20 may acquire the logs of (m+1) generations in the latest period of the acquired divided log sequence. In a case in which logs of generations the number of which is larger than (m+1) generations are stored in the temporary storage unit 52, the information processing device 20 may leave the logs of (m+1) generations from the oldest log in the temporary storage unit 52, and delete the rest of the logs at an optional timing.

At S1014, the information processing device 20 causes the analysis object storage device 24 to store the acquired divided log sequence. At S1015, the information processing device 20 causes the temporary storage unit 52 to store the acquired divided log sequence. The information processing device 20 may perform pieces of the processing at S1013, S1014, and S1015 in any order. However, the information processing device 20 should perform the processing at S1015 before S1013 in the next loop processing.

Following S1013, at S1016, the information processing device 20 successively tracing the comparative log sequence back to the past from the newest log to determine whether the comparative log sequence includes a normal subsequence in which the predetermined first generation number (m) of parent-child relations of a normal process are consecutive. In determining whether the parent-child relation is normal, the information processing device 20 determines that the parent-child relation is normal in a case in which a rule satisfied by the log describing the history of the child process and a rule satisfied by the log describing the history of the parent process agree with the normal graph.

If the comparative log sequence includes the normal subsequence (Yes at S1016), the information processing device 20 ends the processing in this procedure about the log generated at S1002. If the comparative log sequence does not include the normal subsequence (No at S1016), the information processing device 20 advances the process to S1017.

At S1017, the information processing device 20 sets the oldest log in the acquired divided log sequence as a violation log again, and returns the process to S1006. Due to this, at S1006 in the next loop, the information processing device 20 can specify, as a new head process, a parent process of a process the history of which is described in the oldest log included in the divided log sequence that is acquired in the latest period. Thus, the information processing device 20 can perform processing for the next divided log sequence in the next loop. The information processing device 20 then repeats pieces of the processing at S1006 and S1009 to S1017.

Figure 12:
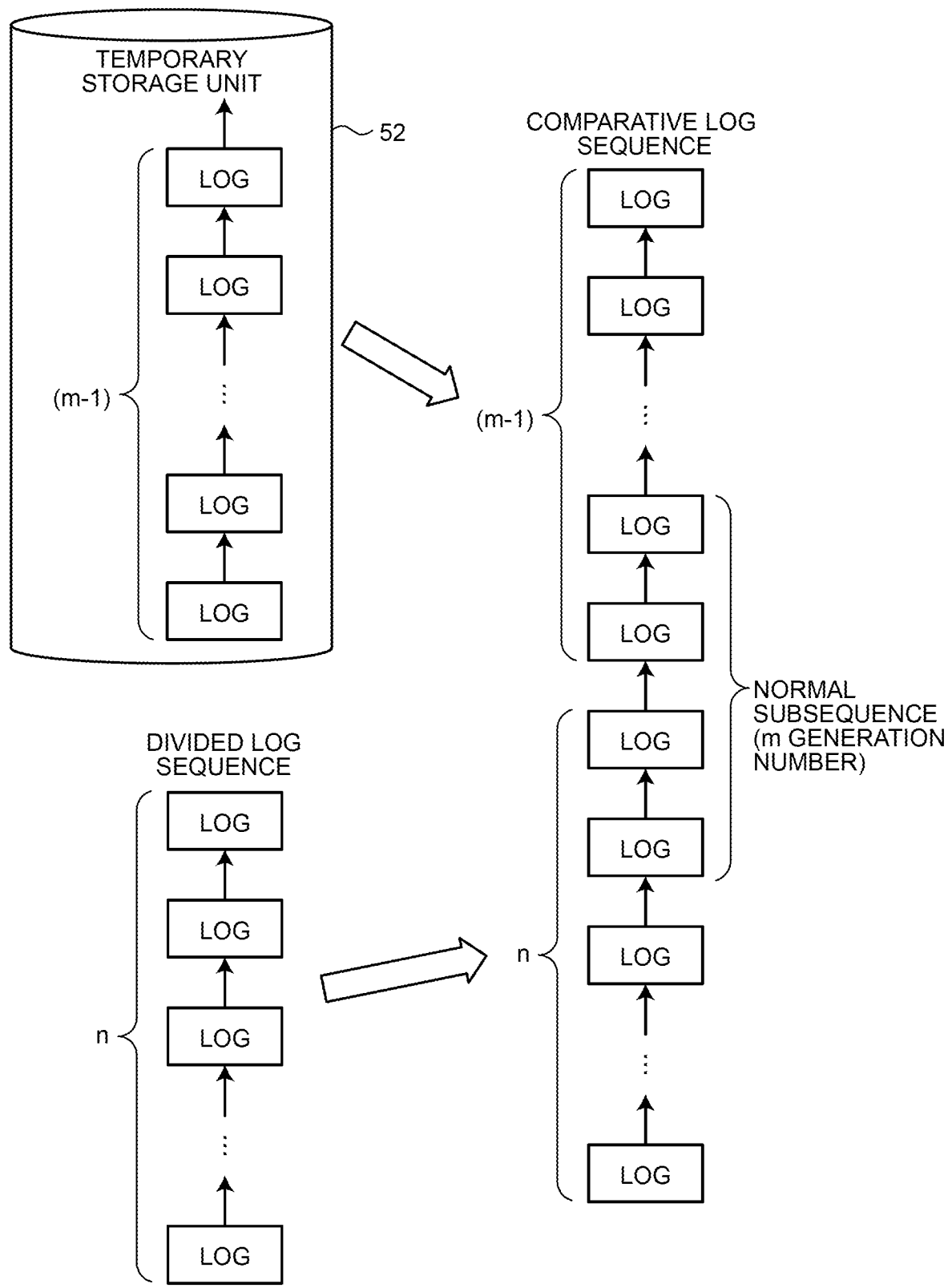
FIG. 12 is an explanatory diagram illustrating generation processing for a comparative log sequence at S1013.

FIG. 12 is a diagram for explaining the generation processing for the comparative log sequence at S1013.

At S1012, the information processing device 20 acquires the divided log sequence including the n generation number of logs from the monitoring device 14. The temporary storage unit 52 of the information processing device 20 stores one or a plurality of logs newer than the divided log sequence. In a case of acquiring the divided log sequence from the monitoring device 14, the information processing device 20 reads out a log newer than the divided log sequence from the temporary storage unit 52, and generates a comparative log sequence by combining the divided log sequence with the log newer than the divided log sequence. The information processing device 20 then determines whether the comparative log sequence includes a normal subsequence in which the first generation number (m) of normal parent-child relations are consecutive.

In a case in which the temporary storage unit 52 stores logs of (m−1) generations or more, the information processing device 20 may read out logs of (m−1) generations newer than the divided log sequence from the temporary storage unit 52 to be combined with the divided log sequence. Due to this, the information processing device 20 can detect the normal subsequence partially including the acquired divided log sequence.

Figure 13:
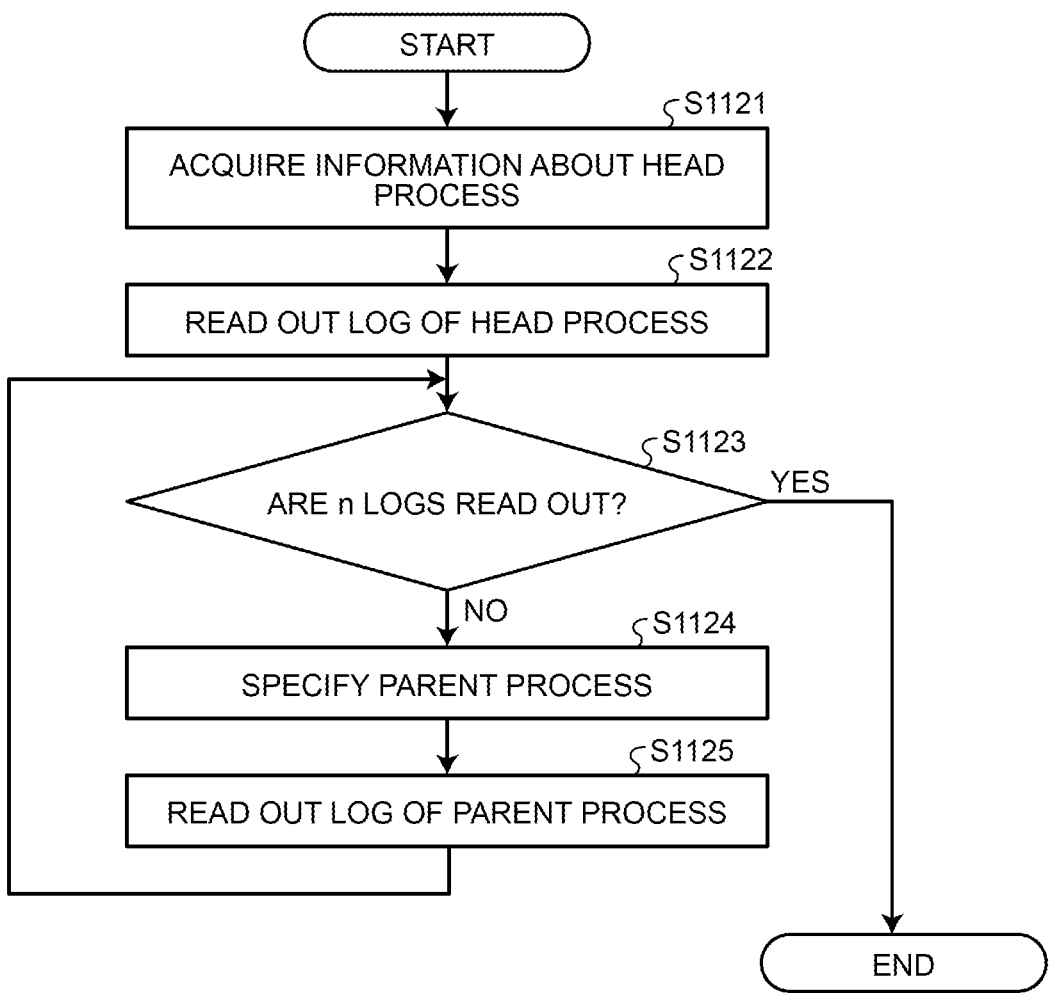
FIG. 13 is a flowchart illustrating a processing procedure at S1011.

FIG. 13 is a flowchart illustrating a procedure of generation processing for the divided log sequence by the monitoring device 14 at S1011. At S1011, the monitoring device 14 performs the processing through the procedure illustrated in FIG. 13.

First, at S1121, the monitoring device 14 acquires the information for identifying the head process from the acquisition request transmitted from the information processing device 20.

Subsequently, at S1122, the monitoring device 14 reads out a log representing a history of the head process from the log storage unit 42 based on the information for identifying the head process. Subsequently, at S1123, the monitoring device 14 determines whether n logs are read out. If the n logs are read out (Yes at S1123), the monitoring device 14 ends this procedure. If the n logs are not read out (No at S1123), the monitoring device 14 advances the process to S1124.

At S1124, the monitoring device 14 specifies a parent process that has caused the process the history of which is represented by the log that has been read out in the latest period. Subsequently, at S1125, the monitoring device 14 reads out the log of the parent process specified at S1123 from the log storage unit 42. After ending the processing at S1125, the monitoring device 14 returns the process to S1123, and repeats pieces of the processing at S1123 to S1125 until the n logs are read out.

In a case in which the log generated by the target device 12 is a violation log violating the normal list, the information processing system 10 as described above acquires the log sequence including respective logs of the processes of multiple generations successively tracing back the process as the generation source of the violation log. The information processing system 10 determines whether the parent-child relation in the acquired log sequence is normal by using the normal graph, and detects the normal subsequence that is the newest subsequence in which the first generation number of normal parent-child relations in the log sequence are consecutive. The information processing system 10 then causes the analysis object storage device 24 to store part of the log sequence at least from the violation log to the normal subsequence as an analysis object of the analysis device 26.

Due to this, for example, in a case in which a malicious process performs an attack with interposing a normal process, the information processing system 10 can detect and analyze such a malicious process. The information processing system 10 does not cause the analysis object storage device 24 to store a log older than the newest normal subsequence in which the first generation number of normal parent-child relations are consecutive in the log sequence, so that the capacity of the analysis object storage device 24 and an analysis amount of the analysis device 26 can be reduced.

In this way, with the information processing system 10, part of the logs generated by the target device 12 effective for analysis can be efficiently stored in the analysis object storage device 24, and the history of an abnormal phenomenon can be easily analyzed by the analysis device 26.

Second Embodiment

Next, the following describes the information processing system 10 according to a second embodiment. The entire configuration of the information processing system 10 according to the second embodiment is the same as that in the first embodiment, and a function and a configuration of each constituent element are also substantially the same as those in the first embodiment. Thus, in the description about the information processing system 10 according to the second embodiment, an element having substantially the same function and configuration as those in the first embodiment is denoted by the same reference numeral, and detailed description thereof will not be repeated except for differences.

Figure 14:
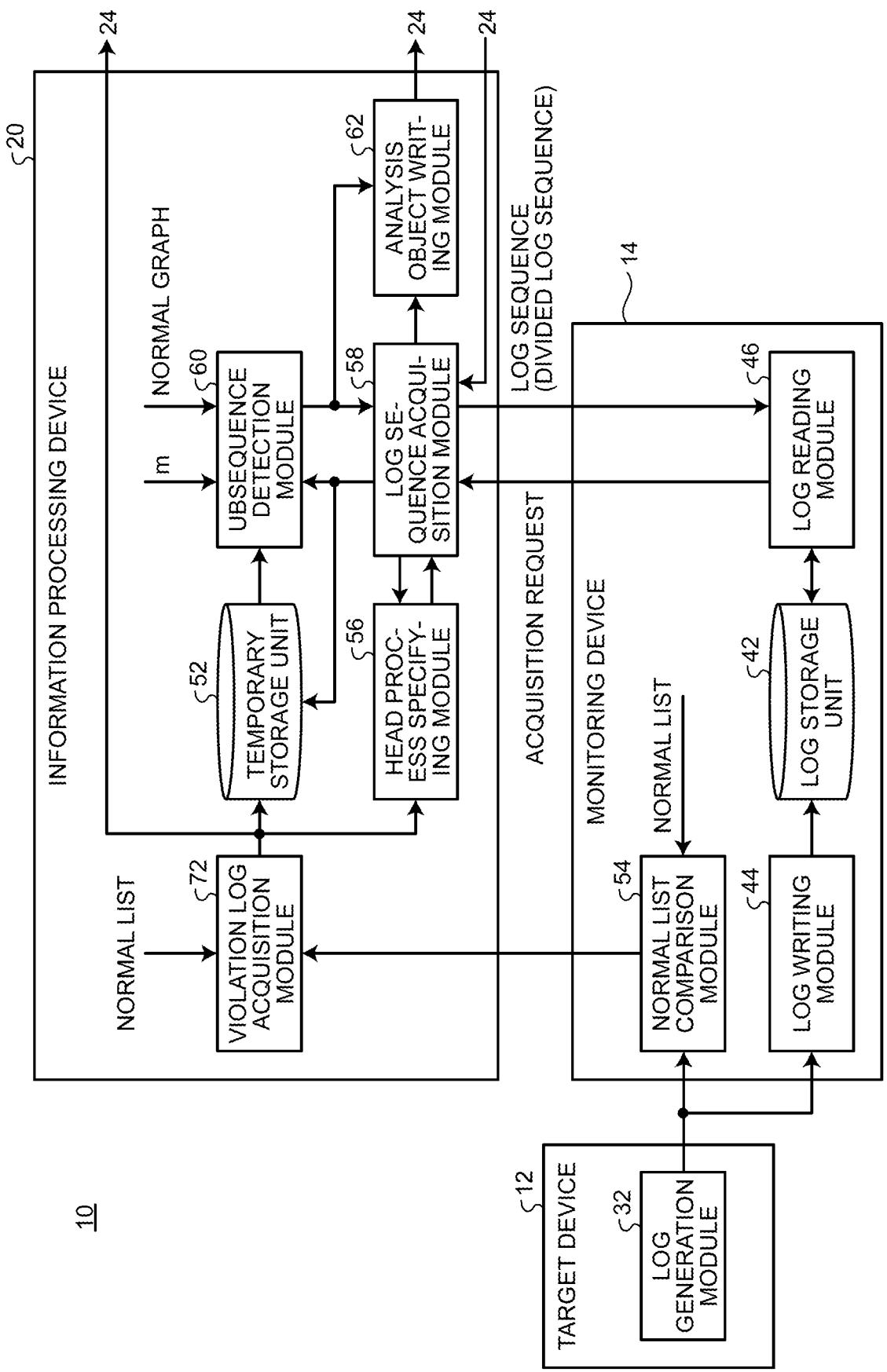
FIG. 14 is a functional configuration diagram of an information processing system according to a second embodiment.

FIG. 14 is a diagram illustrating functional configurations of the target device 12, the monitoring device 14, and the information processing device 20 in the information processing system 10 according to the second embodiment.

The log generation module 32 of the target device 12 according to the second embodiment does not transmit the generated log to the information processing device 20, but transmits the generated log only to the monitoring device 14 associated with the target device 12.

The monitoring device 14 according to the second embodiment further includes the normal list comparison module 54. In the normal list comparison module 54 of each of one or a plurality of the monitoring devices 14, the normal list is set in advance. The normal list comparison module 54 receives a log transmitted from corresponding one of the target devices 12, and determines whether the received log is a violation log violating the normal list. In a case in which the received log is the violation log, the normal list comparison module 54 transmits the violation log to the information processing device 20.

The information processing device 20 according to the second embodiment does not include the normal list comparison module 54. The information processing device 20 according to the second embodiment further includes a violation log acquisition module 72. The violation log acquisition module 72 receives the violation log from each of one or a plurality of the monitoring devices 14. In a case of receiving the violation log, the violation log acquisition module 72 writes the violation log into the analysis object storage device 24. Additionally, in a case of receiving the violation log, the violation log acquisition module 72 writes the violation log into the temporary storage unit 52. Furthermore, in a case of receiving the violation log, the violation log acquisition module 72 gives the violation log to the head process specifying module 56.

Figure 15:
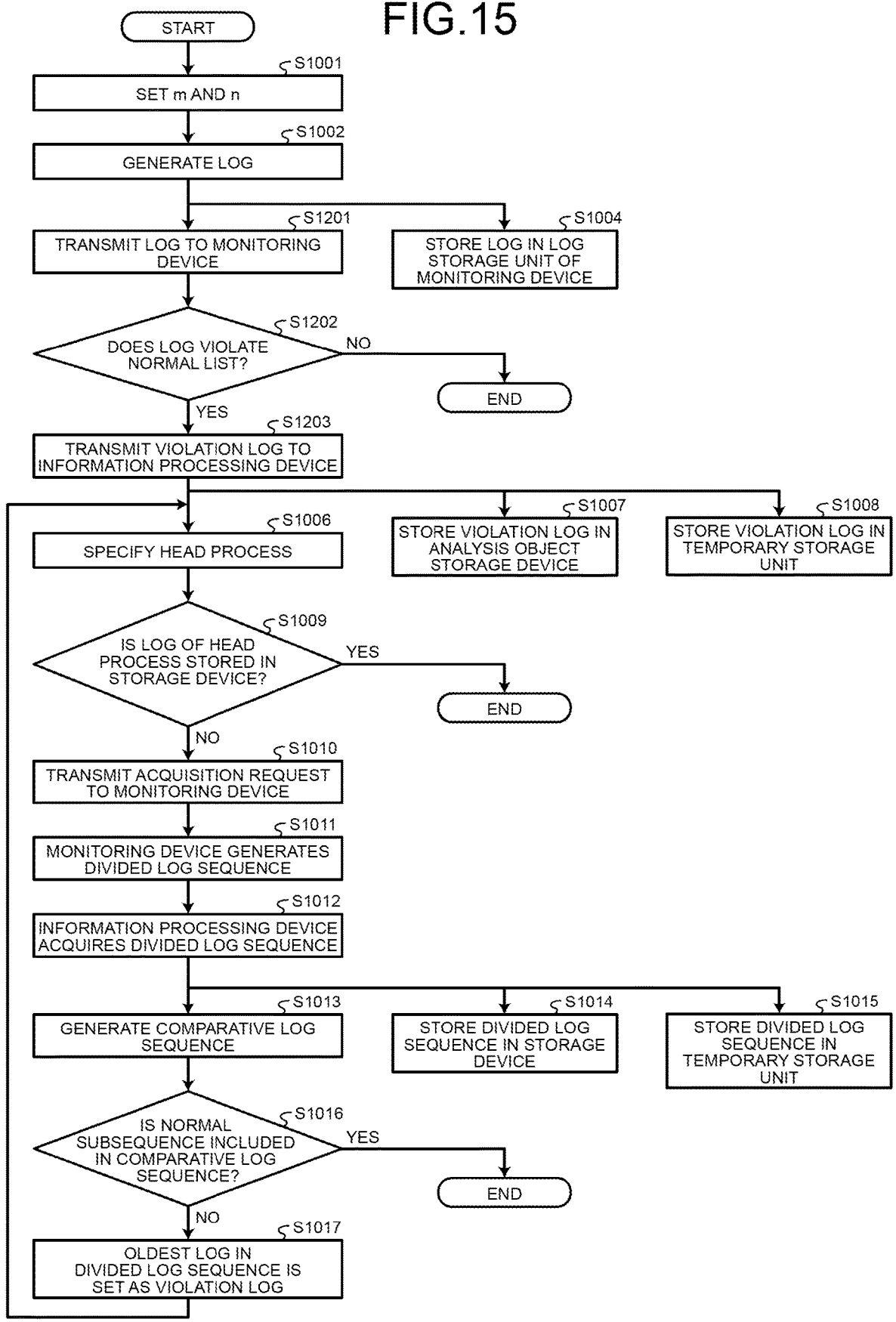
FIG. 15 is a flowchart illustrating a processing procedure of the information processing system according to the second embodiment.

FIG. 15 is a flowchart illustrating a processing procedure of the information processing system 10 according to the second embodiment. The information processing system 10 according to the second embodiment performs processing through the procedure in FIG. 15.

The information processing system 10 according to the second embodiment performs pieces of the processing at S1001 and S1002 similarly to the first embodiment.

The information processing system 10 according to the second embodiment performs processing at S1201 instead of the processing at S1003. At S1201, the target device 12 transmits the generated log to corresponding one of the monitoring devices 14.

The information processing system 10 according to the second embodiment performs pieces of processing at S1202 and S1203 instead of the processing at S1005. The information processing system 10 according to the second embodiment performs the processing at S1202 following the processing at S1201.

At S1202, the monitoring device 14 determines whether the received log violates the normal list set in advance. If the received log does not violate the normal list (No at S1202), the monitoring device 14 ends the processing in this procedure about the log generated at S1002. If the received log violates the normal list (Yes at S1202), the monitoring device 14 performs the processing at S1203 assuming that the received log is the violation log.

At S1203, the monitoring device 14 transmits the violation log to the information processing device 20. The information processing device 20 then receives the violation log from the monitoring device 14.

The information processing system 10 according to the second embodiment then performs pieces of the processing at S1006, S1007, and S1008 following S1203. The information processing system 10 according to the second embodiment performs the same pieces of processing as those in the first embodiment after S1006, S1007, and S1008.

Similarly to the first embodiment, for example, even in a case in which a malicious process performs an attack with interposing a normal process therein, the information processing system 10 according to the second embodiment can detect and analyze such a malicious process. The information processing system 10 according to the second embodiment does not cause the analysis object storage device 24 to store a log older than the newest normal subsequence in which the first generation number of normal parent-child relations are consecutive in the log sequence, so that the capacity of the analysis object storage device 24 and the analysis amount of the analysis device 26 can be reduced.

Furthermore, in the information processing system 10 according to the second embodiment, the monitoring device 14 determines whether the log generated by the target device 12 is the violation log, so that the target device 12 is not required to transmit the log to the information processing device 20, and the monitoring device 14 may transmit the violation log to the information processing device 20 only in a case in which the violation log is detected. Thus, the information processing system 10 according to the second embodiment can reduce the number of logs received by the information processing device 20, and can reduce a communication burden.

Third Embodiment

Next, the following describes the information processing system 10 according to a third embodiment. The entire configuration of the information processing system 10 according to the third embodiment is the same as that in the second embodiment, and a function and a configuration of each constituent element are also substantially the same as those in the second embodiment. Thus, in the description about the information processing system 10 according to the third embodiment, an element having substantially the same function and configuration as those in the second embodiment is denoted by the same reference numeral, and detailed description thereof will not be repeated except for differences.

Figure 16:
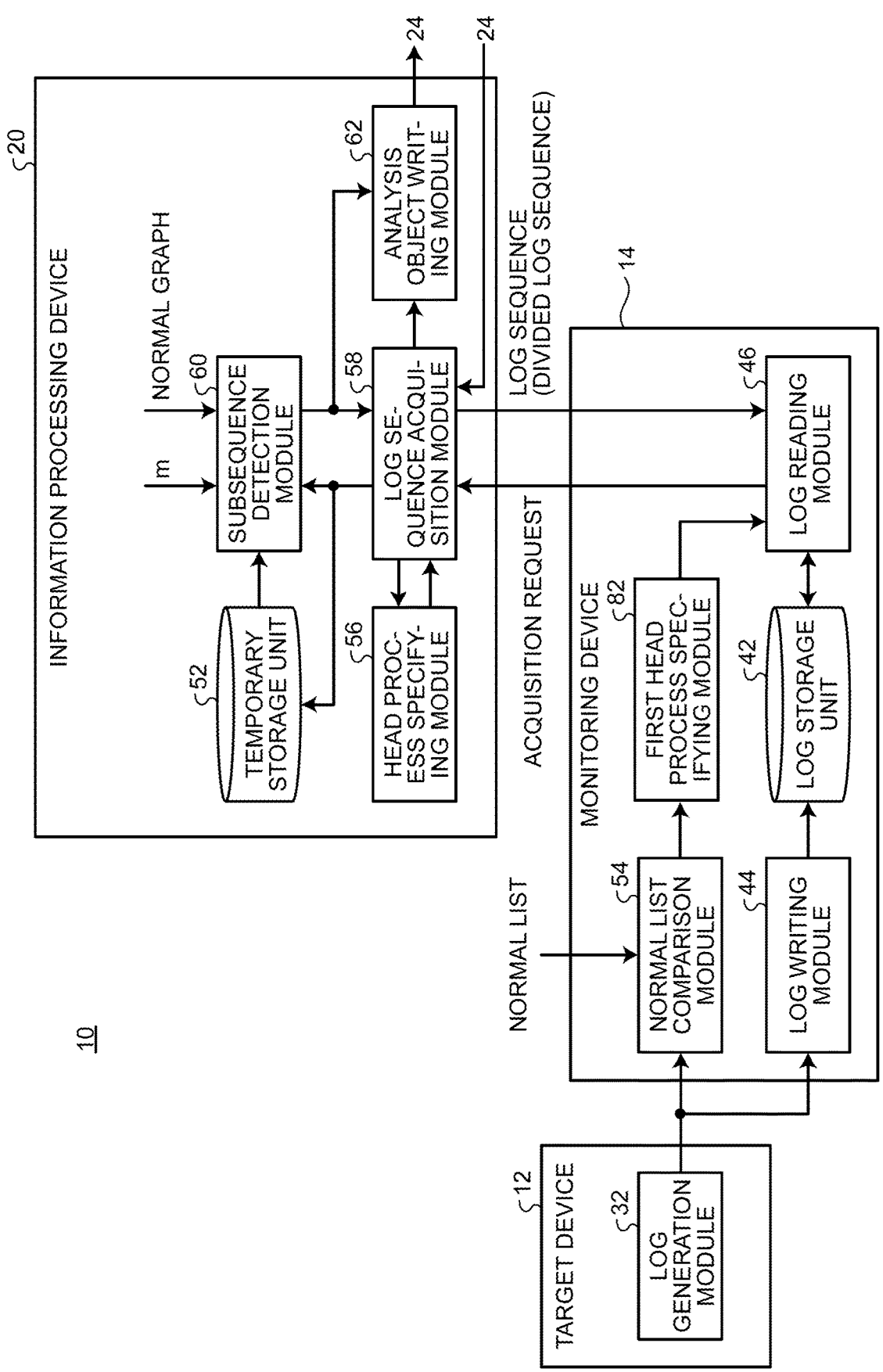
FIG. 16 is a functional configuration diagram of an information processing system according to a third embodiment.

FIG. 16 is a diagram illustrating functional configurations of the target device 12, the monitoring device 14, and the information processing device 20 in the information processing system 10 according to the third embodiment.

The monitoring device 14 according to the third embodiment further includes a first head process specifying module 82.

In a case in which the received log is the violation log, the normal list comparison module 54 according to the third embodiment gives the violation log to the first head process specifying module 82 instead of transmitting the violation log to the information processing device 20.

The first head process specifying module 82 acquires the violation log from the normal list comparison module 54. In a case of acquiring the violation log from the normal list comparison module 54, the first head process specifying module 82 specifies, as the head process, a process that has caused a phenomenon the history of which is described in the violation log. The first head process specifying module 82 gives information for identifying the specified head process to the log reading module 46.

The log reading module 46 according to the third embodiment receives the information for identifying the head process from the first head process specifying module 82. In a case of receiving the information for identifying the head process from the first head process specifying module 82, the log reading module 46 according to the third embodiment reads out a divided log sequence including logs of n generations from the log storage unit 42. That is, the log reading module 46 according to the third embodiment reads out the divided log sequence including the log of the head process and respective logs of processes of (n−1) generations tracing the generation source of the head process back to the past for (n−1) generations. In the present embodiment, every time of receiving the acquisition request, the log reading module 46 outputs the read-out divided log sequence to the information processing device 20.

Similarly to the second embodiment, the log reading module 46 according to the third embodiment receives the acquisition request from the information processing device 20 in some cases. In this case, the log reading module 46 according to the third embodiment performs processing similarly to the second embodiment, and outputs the divided log sequence to the information processing device 20.

The information processing device 20 according to the third embodiment includes the temporary storage unit 52, the head process specifying module 56, the log sequence acquisition module 58, the subsequence detection module 60, and the analysis object writing module 62. That is, the information processing device 20 according to the third embodiment does not include the normal list comparison module 54 as compared with the second embodiment. Thus, the temporary storage unit 52 and the head process specifying module 56 according to the third embodiment do not acquire a violation log from the normal list comparison module 54.

Even in a case of not transmitting the acquisition request to the monitoring device 14, the log sequence acquisition module 58 according to the third embodiment receives the divided log sequence from the monitoring device 14 in some cases. In this case, the log sequence acquisition module 58 according to the third embodiment writes the acquired divided log sequence into the temporary storage unit 52, and gives the acquired divided log sequence to the analysis object writing module 62. In a case in which the subsequence detection module 60 does not detect the normal sequence, the log sequence acquisition module 58 according to the third embodiment performs the processing similarly to the second embodiment.

Figure 17:
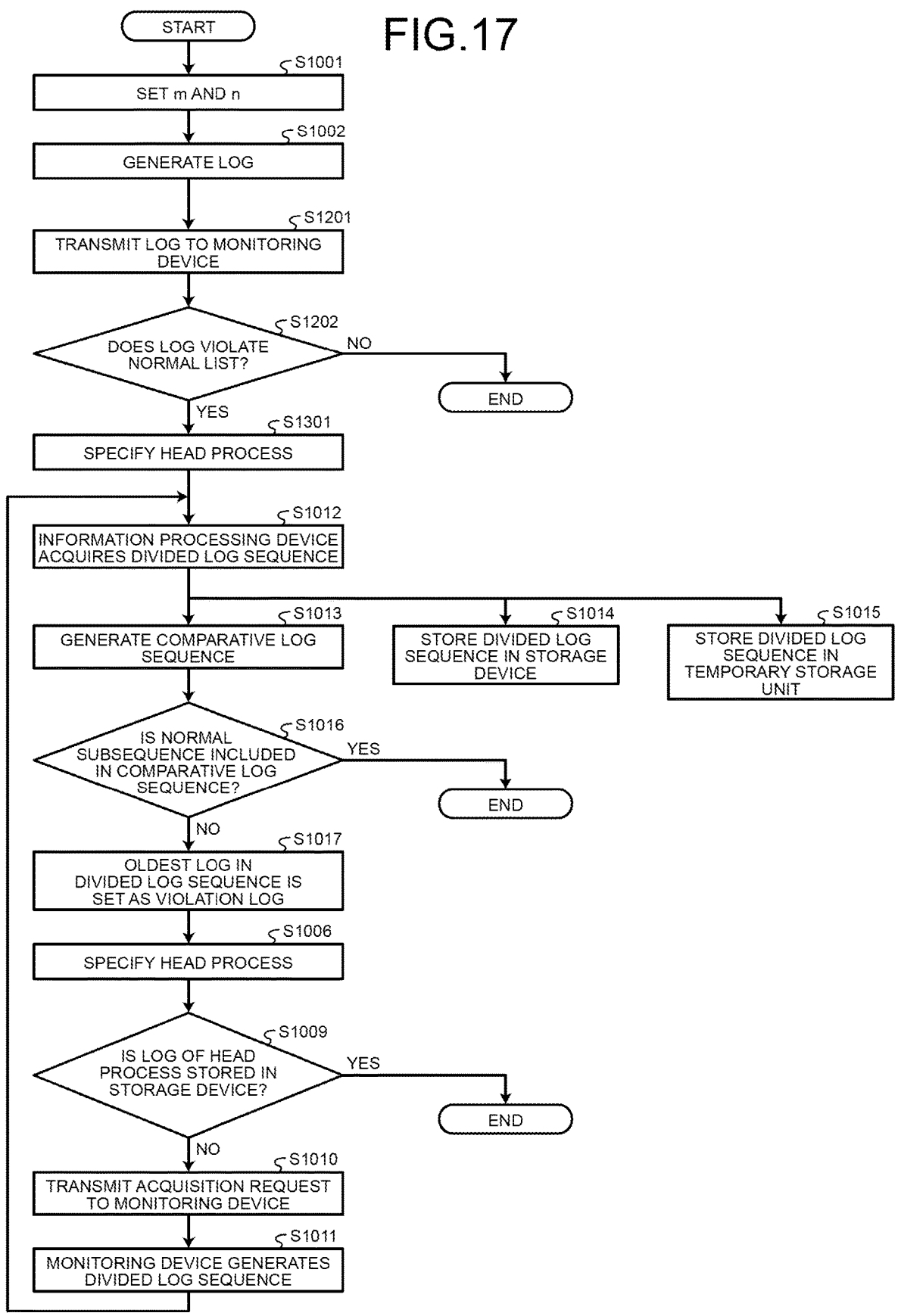
FIG. 17 is a flowchart illustrating a processing procedure of the information processing system according to the third embodiment.

FIG. 17 is a flowchart illustrating a processing procedure of the information processing system 10 according to the third embodiment. The information processing system 10 according to the third embodiment performs processing through a procedure in FIG. 17.

The information processing system 10 according to the third embodiment performs pieces of the processing at S1001, S1002, S1201, and S1202 similarly to the second embodiment. The information processing system 10 according to the third embodiment does not perform pieces of the processing at S1004 and S1203.

Following S1202, the information processing system 10 according to the third embodiment performs processing at S1301. At S1301, the monitoring device 14 specifies, as the head process, a process that has caused an event or a process the history of which is described in the violation log.

The information processing system 10 according to the third embodiment advances the process to S1011 following S1301. The information processing system 10 according to the third embodiment then performs pieces of the processing from S1011 thereafter, and repeats pieces of the processing from S1006 to S1017 until the processing in this procedure is ended at S1009 or S1016.

Similarly to the second embodiment, for example, even in a case in which a malicious process performs an attack with interposing a normal process therein, the information processing system 10 according to the third embodiment can detect and analyze such a malicious process. The information processing system 10 according to the third embodiment does not cause the analysis object storage device 24 to store a log older than the newest normal subsequence in which the first generation number of normal parent-child relations are consecutive in the log sequence, so that the capacity of the analysis object storage device 24 and the analysis amount of the analysis device 26 can be reduced.

Furthermore, in the information processing system 10 according to the third embodiment, the monitoring device 14 determines whether the log generated by the target device 12 is the violation log, so that the target device 12 is not required to transmit the log to the information processing device 20. Additionally, in a case in which the violation log is detected, the information processing system 10 according to the third embodiment does not receive the acquisition request from the information processing device 20, and the monitoring device 14 transmits the divided log sequence to the information processing device 20. Thus, the information processing system 10 according to the third embodiment can reduce the number of logs received by the information processing device 20, and can reduce throughput of the information processing device 20.

Hardware Configuration

Figure 18:
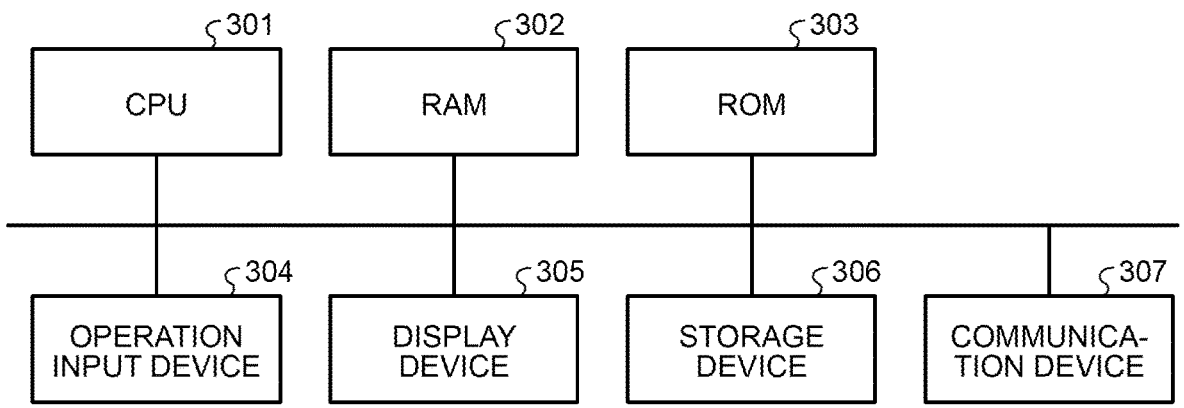
FIG. 18 is a hardware configuration diagram of an information processing device according to the embodiments.

FIG. 18 is a diagram illustrating an example of a hardware configuration of the information processing device 20 according to the embodiments. The information processing device 20 is implemented by a computer having a hardware configuration as illustrated in FIG. 18, for example. The information processing device 20 includes a central processing unit (CPU) 301, a random access memory (RAM) 302, a read only memory (ROM) 303, an operation input device 304, a display device 305, a storage device 306, and a communication device 307. These components are connected to each other via a bus.

The CPU 301 is a processor that executes arithmetic processing, control processing, and the like in accordance with a computer program. The CPU 301 executes various kinds of processing in cooperation with computer programs stored in the ROM 303, the storage device 306, and the like using a predetermined region of the RAM 302 as a working area.

The RAM 302 is a memory such as a Synchronous Dynamic Random Access Memory (SDRAM). The RAM 302 functions as the working area of the CPU 301. The ROM 303 is a memory that stores computer programs and various kinds of information in a non-rewritable manner.

The operation input device 304 is an input device such as a mouse, a keyboard, and the like. The operation input device 304 receives information operationally input by the user as an instruction signal, and outputs the instruction signal to the CPU 301.

The display device 305 is a display device such as a Liquid Crystal Display (LCD). The display device 305 displays various kinds of information based on a display signal from the CPU 301.

The storage device 306 is a device that writes and reads out data into/from a storage medium constituted of a semiconductor such as a flash memory, a storage medium in which data can be magnetically or optically recorded, or the like. The storage device 306 writes and reads out data into/from the storage medium in accordance with control by the CPU 301. The communication device 307 communicates with an external device via the network in accordance with control by the CPU 301.

A computer program executed by the computer has a module configuration including a normal list comparison module, a head process specification module, a log sequence acquisition module, a subsequence detection module, and an analysis object writing module. When being loaded into the RAM 302 to be executed by the CPU 301 (processor), this computer program causes the CPU 301 (processor) to function as the normal list comparison module 54, the head process specifying module 56, the log sequence acquisition module 58, the subsequence detection module 60, and the analysis object writing module 62. Each of the RAM 302 and the storage device 306 functions as the temporary storage unit 52. The computer program executed by the computer may have a configuration not including the normal list comparison module as in the second embodiment and the third embodiment.

The computer program executed by a computer is recorded and provided in a computer-readable recording medium such as a CD-ROM, a flexible disk, a CD-R, and a digital versatile disc (DVD), as an installable or executable file.

This computer program may be stored in a computer connected to a network such as the Internet and provided by being downloaded via the network. This computer program may be provided or distributed via a network such as the Internet. The computer program executed by the information processing device 20 may be embedded and provided in the ROM 303 and the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device configured to cause an analysis object storage device to store some of a plurality of logs each describing a history of a phenomenon occurred in a target device, the information processing device comprising:
a memory; and
one or more processors coupled to the memory and configured to:
acquire, from among the plurality of logs, a violation log violating a normal list in which a condition for a normal log is described, and specify, as a head process, a process that has caused the phenomenon the history of which is described in the violation log;
acquire a log sequence including a log of the head process and respective logs of processes of multiple generations successively tracing a generation source of the head process back to a past;
detect, assuming that a process a history of which is described in an optional log is a child process and a process as a generation source of the child process is a parent process, based on a normal graph describing a condition for a normal parent-child relation between a log describing the history of the child process and a log describing a history of the parent process, a newest subsequence in which a predetermined first generation number of normal parent-child relations in the log sequence are consecutive as a normal subsequence; and
cause the analysis object storage device to store part of the log sequence at least from the violation log to the normal subsequence,
wherein the one or more processors are configured to:
repeatedly acquire a divided log sequence obtained by dividing the log sequence for every n generations until the normal subsequence is detected, n being an integer number larger than the first generation number;
detect the normal subsequence every time of acquiring the divided log sequence; and
cause the analysis object storage device to store the acquired divided log sequence every time of acquiring the divided log sequence.

2. The information processing device according to claim 1, wherein the normal list includes one or a plurality of rules describing the condition for a normal log.

3. The information processing device according to claim 2, wherein
the normal graph includes a rule to be satisfied by the log describing the history of the parent process when the log describing the history of the child process satisfies a target rule for each of the one or the plurality of rules, and
in determining whether the parent-child relation is normal, the one or more processors are configured to determine, when a rule satisfied by the log describing the history of the child process and a rule satisfied by the log describing the history of the parent process agree with the normal graph, that the parent-child relation is normal.

4. The information processing device according to claim 1, wherein the phenomenon occurred in the target device includes an event occurred in the target device or a process performed by the target device.

5. The information processing device according to claim 1, wherein, the one or more processors are configured to end, when the log describing a history of the head process is stored in the analysis object storage device, processing without acquiring a next divided log sequence.

6. The information processing device according to claim 1, wherein
the one or more processors are further configured to receive a log from the target device and determine whether the received log is the violation log based on the normal list.

7. An information processing system comprising:
the information processing device according to claim 1;
the target device; and
a monitoring device configured to monitor the target device,
the target device being configured to generate a log describing a history of a phenomenon every time the phenomenon occurs, and transmit the generated log to the information processing device and the monitoring device,
the monitoring device comprising:
a log storage unit; and
one or more processors coupled to the log storage unit and configured to:
receive a log from the target device and write the acquired log into the log storage unit; and
read out the log sequence from the log storage unit in response to an acquisition request from the information processing device, and transmit the log sequence to the information processing device, and
the one or more processors of the information processing device being further configured to receive a log from the target device, and compare the received log with the normal list to determine whether the received log is the violation log.

8. An information processing system comprising:
the information processing device according to claim 1;
the target device; and
a monitoring device configured to monitor the target device,
the target device being configured to generate a log describing a history of a phenomenon every time the phenomenon occurs, and transmit the generated log to the monitoring device, and
the monitoring device comprising:
a log storage unit; and
one or more processors coupled to the log storage unit and configured to:
receive a log from the target device and write the acquired log into the log storage unit;
read out the log sequence from the log storage unit in response to an acquisition request from the information processing device, and transmit the log sequence to the information processing device;
receive a log from the target device, and compare the received log with the normal list to determine whether the received log is the violation log; and
transmit the log sequence to the information processing device.

9. An information processing system comprising:
the information processing device according to claim 1;
the target device; and
a monitoring device configured to monitor the target device,
the target device being configured to generate a log describing a history of a phenomenon every time the phenomenon occurs, and transmit the generated log to the monitoring device, and
the monitoring device comprising:
a log storage unit; and
one or more processors coupled to the log storage unit and configured to:
receive a log from the target device and write the acquired log into the log storage unit;
read out the log sequence from the log storage unit, and transmit the log sequence to the information processing device;
receive a log from the target device, and compare the received log with the normal list to determine whether the received log is the violation log; and
transmit the log sequence to the information processing device when the violation log is detected.

10. A computer program product comprising a non-transitory computer-readable medium including programmed instructions, the instructions causing a computer to function as an information processing device configured to cause an analysis object storage device to store some of a plurality of logs each describing a history of a phenomenon occurred in a target device,
the instructions causing the computer to:
acquire, from among the plurality of logs, a violation log violating a normal list in which a condition for a normal log is described, and specify, as a head process, a process that has caused the phenomenon the history of which is described in the violation log;
acquire a log sequence including a log of the head process and respective logs of processes of multiple generations successively tracing a generation source of the head process back to a past;
detect, assuming that a process a history of which is described in an optional log is a child process and a process as a generation source of the child process is a parent process, based on a normal graph describing a condition for a normal parent-child relation between a log describing the history of the child process and a log describing a history of the parent process, a newest subsequence in which a predetermined first generation number of normal parent-child relations in the log sequence are consecutive as a normal subsequence; and
cause the analysis object storage device to store part of the log sequence at least from the violation log to the normal subsequence,
wherein the instructions cause the computer to:
repeatedly acquire a divided log sequence obtained by dividing the log sequence for every n generations until the normal subsequence is detected, n being an integer number larger than the first generation number;
detect the normal subsequence every time of acquiring the divided log sequence; and
cause the analysis object storage device to store the acquired divided log sequence every time of acquiring the divided log sequence.

11. An information processing method performed by a computer of an information processing device configured to cause an analysis object storage device to store some of a plurality of logs each describing a history of a phenomenon occurred in a target device, the method comprising:
by the information processing device,
acquiring, from among the plurality of logs, a violation log violating a normal list in which a condition for a normal log is described, and specifying, as a head process, a process that has caused the phenomenon the history of which is described in the violation log;
acquiring a log sequence including a log of the head process and respective logs of processes of multiple generations successively tracing a generation source of the head process back to a past;
detecting, assuming that a process a history of which is described in an optional log is a child process and a process as a generation source of the child process is a parent process, based on a normal graph describing a condition for a normal parent-child relation between a log describing the history of the child process and a log describing a history of the parent process, a newest subsequence in which a predetermined first generation number of normal parent-child relations in the log sequence are consecutive as a normal subsequence; and
causing the analysis object storage device to store part of the log sequence at least from the violation log to the normal subsequence,
wherein the method comprises:
by the information processing device,
repeatedly acquiring a divided log sequence obtained by dividing the log sequence for every n generations until the normal subsequence is detected, n being an integer number larger than the first generation number;
detecting the normal subsequence every time of acquiring the divided log sequence; and
causing the analysis object storage device to store the acquired divided log sequence every time of acquiring the divided log sequence.

* * * * *